US012494330B2

(12) United States Patent
Wahl, III et al.

(10) Patent No.: US 12,494,330 B2
(45) Date of Patent: Dec. 9, 2025

(54) THERMAL ABSORBER FOR CONTACTOR

(71) Applicant: TE Connectivity Solutions GmbH, Schaffhausen (CH)

(72) Inventors: Frank Peter Wahl, III, Ventura, CA (US); Manik S. Sethi, Somerville, MA (US)

(73) Assignee: TW Connectivity Solutions GmbH (CH)

( * ) Notice: Subject to any disclaimer, the term of this patent is extended or adjusted under 35 U.S.C. 154(b) by 315 days.

(21) Appl. No.: 18/297,351

(22) Filed: Apr. 7, 2023

(65) Prior Publication Data

US 2024/0321526 A1 Sep. 26, 2024

Related U.S. Application Data

(60) Provisional application No. 63/491,539, filed on Mar. 22, 2023.

(51) Int. Cl.
*H01H 1/62* (2006.01)

(52) U.S. Cl.
CPC ......... *H01H 1/62* (2013.01); *H01H 2205/002* (2013.01)

(58) Field of Classification Search
CPC ........ H01H 1/00; H01H 1/62; H01H 2205/00; H01H 2205/002; H01H 2001/58; H01H 2009/52; H01H 2011/06; H01H 2011/065
See application file for complete search history.

(56) References Cited

U.S. PATENT DOCUMENTS

| | | | | |
|---|---|---|---|---|
| 9,142,364 | B2 | 9/2015 | Pal | |
| 10,217,693 | B1 | 2/2019 | Ing et al. | |
| 12,090,877 | B2 * | 9/2024 | Choi | H01R 13/6683 |
| 2018/0132343 | A1 | 5/2018 | Pal | |
| 2019/0139716 | A1 | 5/2019 | Burkman | |

OTHER PUBLICATIONS

Extended European Search Report, EP 26144941 International Filing Date Mar. 12, 2024.

Weigand Rebecca et al: "An Introduction to PCM Heat Sinks—Mobility Engineering Technology", Aerospace & Defense Technology. Feb. 1, 2019 XP093197746.

(Continued)

*Primary Examiner* — Anthony R Jimenez

(57) ABSTRACT

A contactor includes a housing having a wall defining a cavity and a cover closing the cavity. The contactor includes a first fixed contact and a second fixed contact received in the cavity. The contactor includes a movable contact movable within the cavity between a mated position and an unmated position. The movable contact engages the first and second fixed contacts to electrically connect the first fixed contact and the second fixed contact in the mated position. The contactor includes a coil assembly in the cavity operated to move the movable contact between the unmated position and the mating position. The contactor includes a thermal absorber thermally coupled to the first fixed contact to reduce an operating temperature of the first fixed contact. The thermal absorber includes a phase change material element configured to absorb heat from the first fixed contact.

19 Claims, 7 Drawing Sheets

(56) References Cited

OTHER PUBLICATIONS

Anonymous. "Laminated Bus Bar Solutions", Jan. 1, 2017 XP093197742.
Pakrouh R. et al: "A Parametric Investigation of A PCM-Based Pin Fin Heat Sink", Mechanical Sciences, vol. 6, No. 1, May 19, 2025 XP093198107.
Ashraf Muhammad Junaid et al: Experimental passive electronics cooling: Parametric investigation of pin fin geometries and efficient phase change materials, International Journal of Heat and Mass Transfer, Elsevier Amsterdam NL: vol. 115. Aug. 19, 2017 XP085196465.

* cited by examiner

THERMAL ABSORBER FOR CONTACTOR

CROSS REFERENCE TO RELATED APPLICATIONS

This application claims benefit to U.S. Provisional Application No. 63/491,539, filed 22 Mar. 2023, titled "THERMAL ABSORBER FOR CONTACTOR", the subject matter of which is herein incorporated by reference in its entirety.

BACKGROUND OF THE INVENTION

The subject matter herein relates generally to contactors.

Certain electrical applications, such as HVAC, power supply, locomotives, elevator control, motor control, aerospace applications, hybrid electric vehicles, fuel-cell vehicles, charging systems, and the like, utilize electrical contactors having contacts that are normally open (or separated). The contacts are closed (or joined) to supply power to a particular device. When the contactor receives an electrical signal, the contactor is energized to introduce a magnetic field to drive a movable contact to mate with fixed contacts. Power is transferred through the electrical contactor when the movable contact is closed. During use, heat is generated through the conductors, such as through the conductors of the cables, the terminals at the ends of the cables, and the contacts of the contactor. For some high power, high current applications, the components of the system may be damaged due to the high temperatures over prolonged periods of time. To avoid damage, some designs utilize larger contactors having larger components to handle the higher temperatures. However, the larger contacts have increased weight, which may be problematic in some applications, such as aerospace applications.

A need exists for a contactor that overcomes the above problems and addresses other concerns experienced in the prior art.

BRIEF DESCRIPTION OF THE INVENTION

In one embodiment, a contactor is provided and includes a housing having a wall defining a cavity and a cover closing the cavity. The contactor includes a first fixed contact and a second fixed contact received in the cavity. The contactor includes a movable contact movable within the cavity between a mated position and an unmated position. The movable contact engages the first and second fixed contacts to electrically connect the first fixed contact and the second fixed contact in the mated position. The contactor includes a coil assembly in the cavity operated to move the movable contact between the unmated position and the mating position. The contactor includes a thermal absorber thermally coupled to the first fixed contact to reduce an operating temperature of the first fixed contact. The thermal absorber includes a phase change material element configured to absorb heat from the first fixed contact.

In another embodiment, a contactor is provided and includes a housing having a wall defining a cavity and a cover closing the cavity. The housing includes a chamber wall defining a chamber. The contactor includes a first fixed contact and a second fixed contact received in the cavity. The contactor includes a movable contact movable within the cavity between a mated position and an unmated position. The movable contact engages the first and second fixed contacts to electrically connect the first fixed contact and the second fixed contact in the mated position. The contactor includes a coil assembly in the cavity operated to move the movable contact between the unmated position and the mating position. The contactor includes a thermal absorber received in the chamber. The thermal absorber thermally coupled to the first fixed contact to reduce an operating temperature of the first fixed contact. The thermal absorber includes a phase change material element configured to absorb heat from the first fixed contact.

In a further embodiment, a contactor is provided and includes a housing having an outer wall defining a cavity and a cover closing the cavity. The contactor includes a first fixed contact and a second fixed contact received in the cavity. The contactor includes a movable contact movable within the cavity between a mated position and an unmated position. The movable contact engages the first and second fixed contacts to electrically connect the first fixed contact and the second fixed contact in the mated position. The contactor includes a coil assembly in the cavity operated to move the movable contact between the unmated position and the mating position. The contactor includes a thermal absorber thermally coupled to the first fixed contact to reduce an operating temperature of the first fixed contact. The thermal absorber includes an absorber housing defining an absorber chamber. The absorber housing located exterior of the housing. The thermal absorber includes a phase change material element received in the absorber chamber. The phase change material element configured to absorb heat from the first fixed contact.

DETAILED DESCRIPTION OF THE INVENTION

Figure 1:
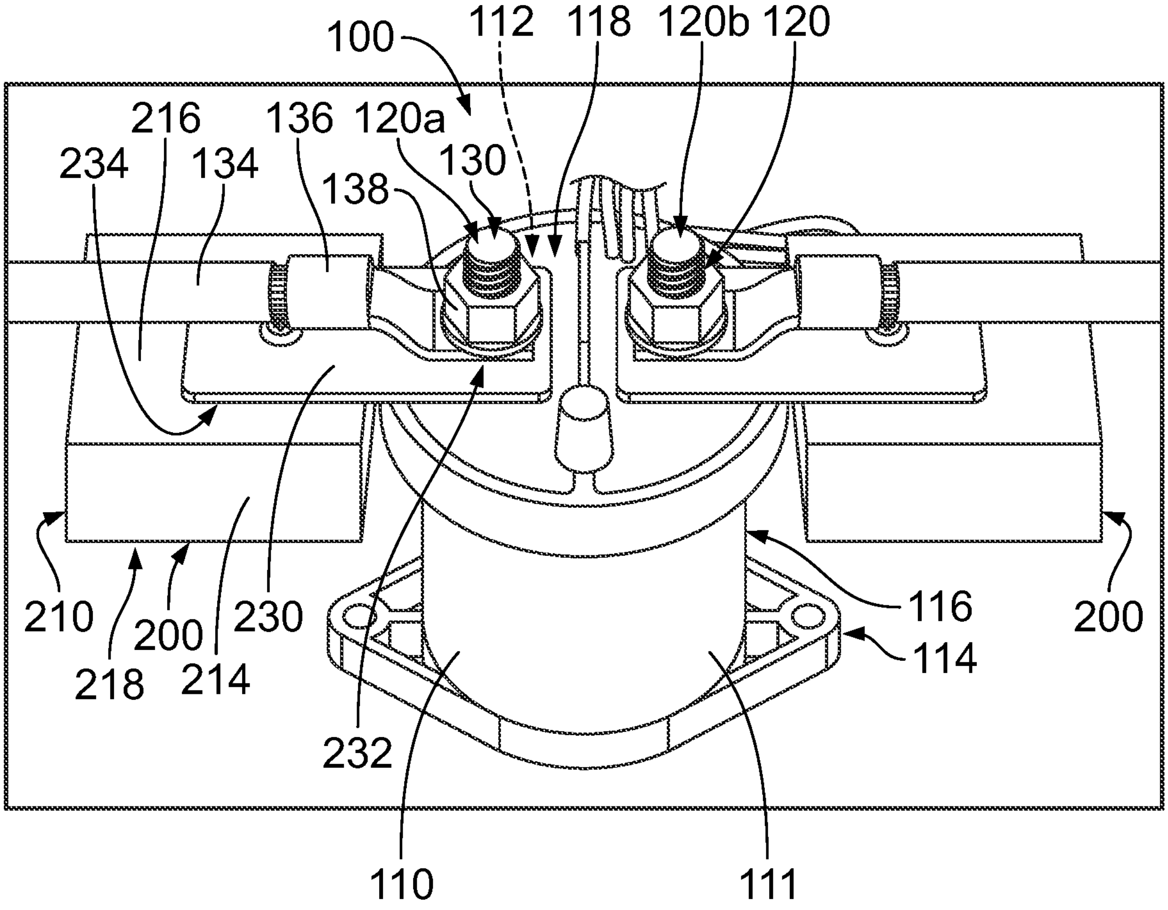
FIG. 1 is a perspective view of a contactor in accordance with an exemplary embodiment including at least one thermal absorber.
Figure 2:
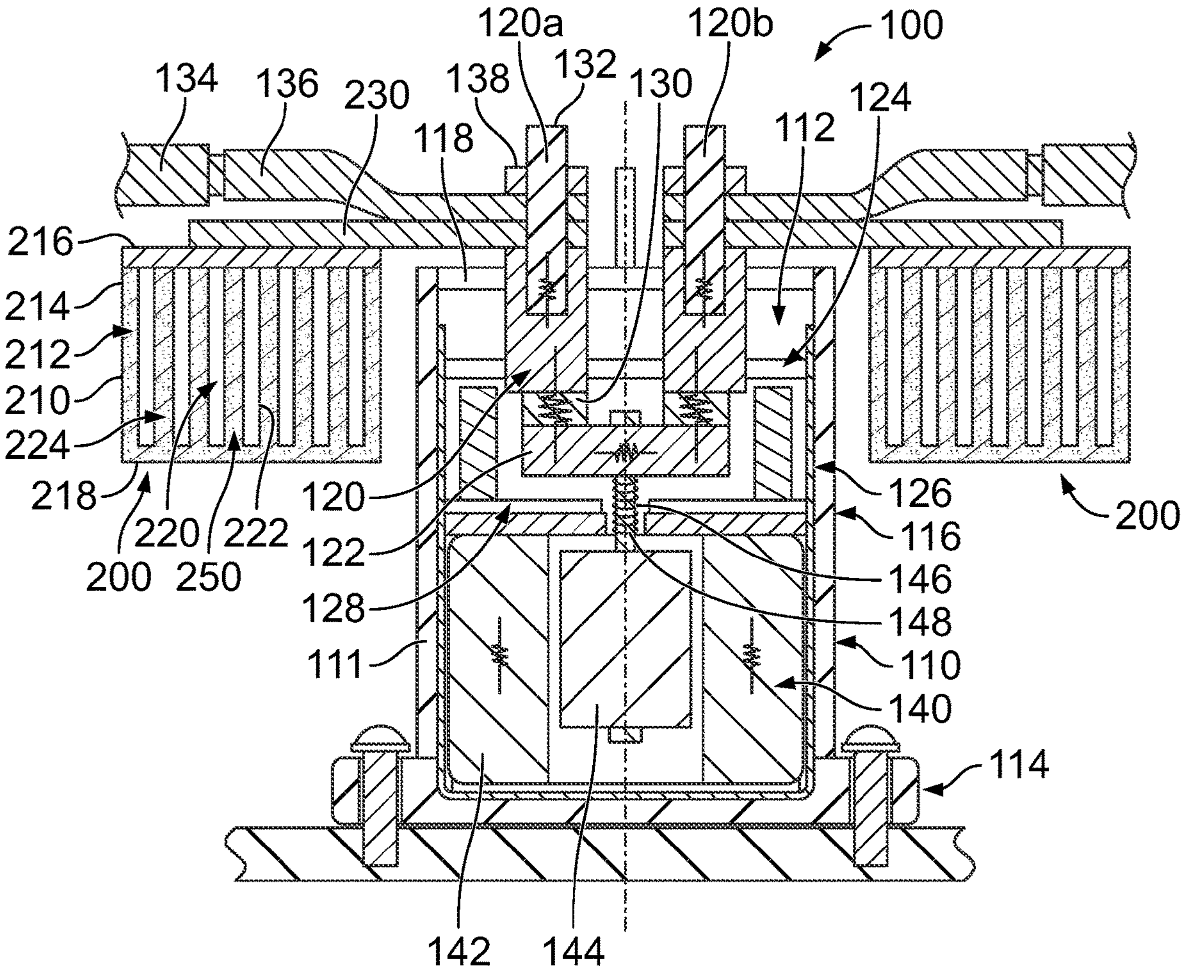
FIG. 2 is a cross-sectional view of the contactor in accordance with an exemplary embodiment.

FIG. 1 is a perspective view of a contactor 100 in accordance with an exemplary embodiment including at least one thermal absorber 200. FIG. 2 is a cross-sectional view of the contactor 100 in accordance with an exemplary embodiment. The contactor 100 is an electrical switch or relay that safely connects and disconnects one or more electrical circuits to protect the flow of power through the system. The contactor 100 may be used in various applications such as HVAC, power supply, locomotives, elevator control, motor control, aerospace applications, hybrid electric vehicles, fuel-cell vehicles, charging systems, and the like. The thermal absorber 200 may be used with other types of non-electromechanical power switching devices. For example, the thermal absorber 200 may be used on a solid-state contactors.

The contactor 100 includes a housing 110 having a wall 111 surrounding a cavity 112. The housing 110 may be a multi-piece housing in various embodiments. The housing 110 includes a base 114 and a header 116 extending from the base 114. Optionally, the base 114 may be configured to be coupled to another component. For example, the base 114 may include mounting brackets for securing the contactor 100 to the other component. In the illustrated embodiment, the header 116 is located above the base 114; however, the housing 110 may have other orientations in alternative embodiments. The housing 110 includes a cover 118 for closing the cavity 112. For example, the cover 118 may be coupled to the top of the header 116. Optionally, the cover 118 may be sealed to the header 116. The wall 111 along the header 116 may be cylindrical defining a cylindrical cavity 112 in various embodiments.

The contactor 100 includes fixed contacts 120 received in the cavity 112 and a movable contact 122 movable within the cavity 112 between a mated position and an unmated position. The movable contact 122 engages the fixed contacts 120 to electrically connect the fixed contacts 120 in the mated position. In the illustrated embodiment, the contactor 100 includes first and second fixed contacts 120*a*, 120*b*. The fixed contacts 120 are fixed to the housing 110. For example, the fixed contacts 120 may be coupled to the header 116 and/or the cover 118. In other various embodiments, the fixed contacts 120 may be coupled to an insert 124 of the housing 110 inserted into the cavity 112. The insert 124 may be removable from the cavity 112 when the cover 118 is removed from the header 116. In an exemplary embodiment, the insert 124 of the housing 110 includes a contact holder 126 configured to hold the fixed contacts 120. The contact holder 126 defines an enclosure 128. The fixed contacts 120 extend into the enclosure 128. The movable contact 122 is located in the enclosure 128. The outer wall 111 surrounds the enclosure 128.

The fixed contacts 120 each include a terminating end 130 and a mating end 132. The terminating end 130 is configured to be terminated to another component, such as a wire 134 and/or a terminal 136, such as a line in or a line out wire. In an exemplary embodiment, the terminating end 130 is exposed at the exterior of the contactor 100 for terminating to the other component. The terminating end 130 may be threaded to receive a nut 138. In the illustrated embodiment, the terminating end 130 extends through the cover 118 and is located above the cover 118. The mating end 132 is located within the cavity 112 for mating engagement with the movable contact 122, such as when the contactor 100 is energized. In the illustrated embodiment, the mating end 132 is generally flat for engaging the movable contact 122. However, the mating end 132 may have other shapes in alternative embodiments, such as a rounded shape to form a mating bump at the mating end 132 for mating with the movable contact 122.

The contactor 100 includes a coil assembly 140 in the cavity 112 operated to move the movable contact 122 between the unmated position and the mated position. The coil assembly 140 includes a winding or coil 142 wound around a core 144 to form an electromagnet. The coil assembly 140 includes a plunger 146 coupled to the core 144. The movable contact 122 is coupled to the plunger 146 and is movable with the plunger 146 when the coil assembly 140 is operated. The coil assembly 140 includes a spring 148 for returning the movable contact 122 to the unmated position when the coil assembly 140 is deenergized.

The thermal absorbers 200 are provided for lowering the operating temperatures of the components of the contactor 100. In an exemplary embodiment, two of the thermal absorbers 200 are provided, one for each of the fixed contacts 120*a*, 120*b*. However, greater or fewer thermal absorbers 200 may be provided in alternative embodiments. In an exemplary embodiment, the thermal absorber 200 is thermally coupled to the fixed contact 120 to reduce an operating temperature of the fixed contact 120. The thermal absorber 200 may be thermally coupled to the conductor of the wire 134 to reduce an operating temperature of the wire 134. The thermal absorber 200 may be thermally coupled to the terminal 136 to reduce an operating temperature of the terminal 136. In an exemplary embodiment, the material of the thermal absorber 200 is thermally-coupled to the contact 120 and/or wire 134 but in a separate pocket or hermetically-separate chamber from the vacuum chamber containing the contact 120 and/or the wire 134 to keep the material from leaking or off-gassing into the contact chamber and potentially contaminating the contacts 120.

Figure 3:
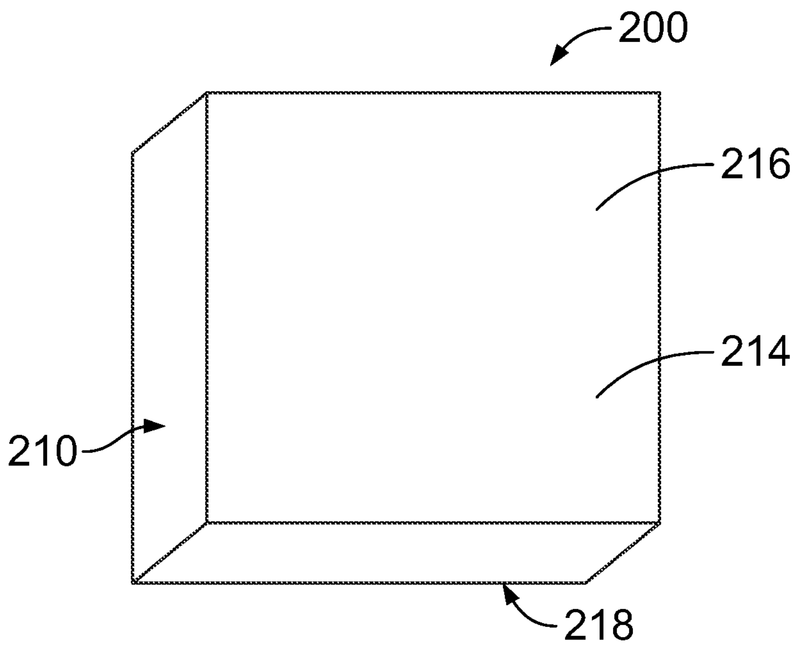
FIG. 3 is a top perspective view of the thermal absorber in accordance with an exemplary embodiment.
Figure 4:
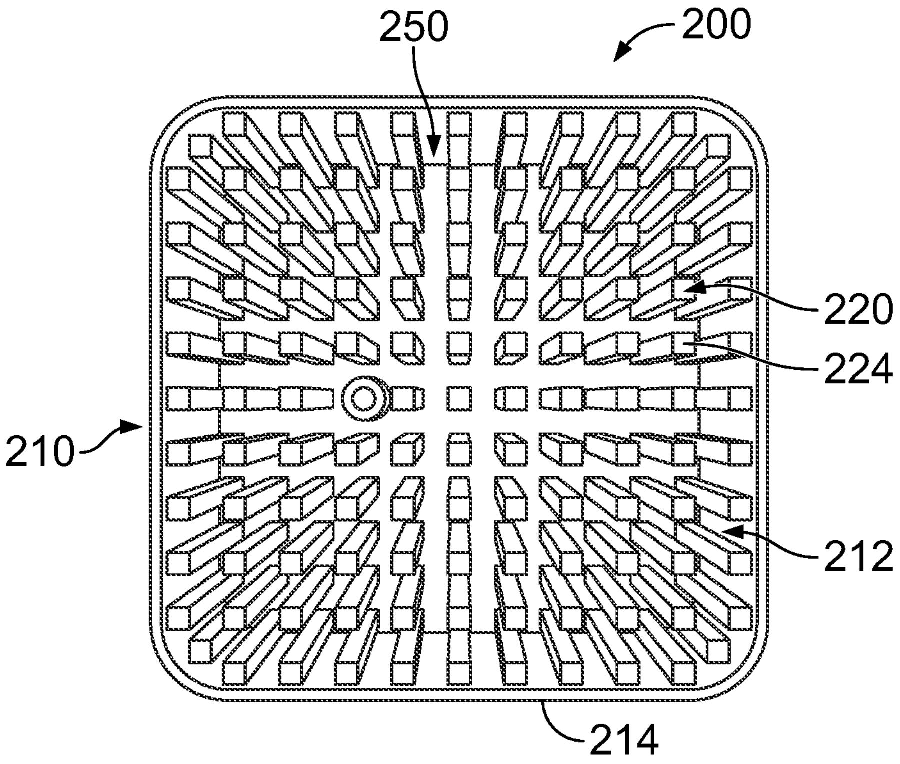
FIG. 4 is a bottom view of a portion of the thermal absorber in accordance with an exemplary embodiment.

With additional reference to FIGS. 3 and 4, FIG. 3 is a top perspective view of the thermal absorber 200 in accordance with an exemplary embodiment and FIG. 4 is a bottom view of a portion of the thermal absorber 200 in accordance with an exemplary embodiment. The thermal absorber 200 includes an absorber housing 210 and a phase change material element 250 configured to absorb heat from the fixed contact 120. The phase change material element 250 provide passive heat absorption. The absorber housing 210 contains the phase change material element 250. For example, the absorber housing 210 forms an absorber chamber 212 and the phase change material element 250 is received in the absorber chamber 212. The phase change material element 250 may substantially fill the absorber chamber 212.

The absorber housing 210 includes walls 214 forming the absorber chamber 212. The walls 214 include an upper wall 216 and a lower wall 218. The upper wall 216 and/or the lower wall 218 may be removable to access the absorber chamber 212, such as to fill the absorber channel with the phase change material element 250. In various embodiments, the walls 214 may be flexible, such as being manufactured from a film, such as to reduce weight. In other various embodiments, the walls 214 may be rigid, such as being plastic or metal walls. The walls 214 may be thermally conductive to transfer heat along the walls 214, such as into phase change material element 250. In various embodiments, the upper wall 216 and/or the lower wall 218 may be manufactured from different materials from other walls 214. The absorber housing 210 may have some provision to ensure the thermal coefficient of expansion of the phase change material does not negatively affect the mechanical integrity of the thermal absorbers or the contactor in general (for example, room to expand).

In an exemplary embodiment, the absorber housing 210 includes at least one sink element 220 extending into the absorber chamber 212. The phase change material element 250 surrounds the at least one sink element 220 to transfer heat between the at least one sink element 220 and the phase change material element 250. The sink elements 220 transfer heat throughout the absorber chamber 212 to more uniformly and quickly transfer heat into the phase change material element 250. The sink elements 220 improve thermal effusivity and the ability to spread heat into the phase change material element 250. In various embodiments, the sink elements 220 are manufactured from a thermally conductive material, such as a metal material (for example, aluminum or copper). The sink element(s) 220 may extend from one of the walls 214, such as the upper wall 216 and/or the lower wall 218. The sink element(s) 220 may be thermally coupled to the corresponding wall 214. In various embodiments, the sink elements 220 include posts 222 arranged in an array within the absorber chamber 212. The posts 222 may be arranged in rows and columns. The spaces 224 are defined between the posts 222. The spaces 224 may be at least partially filled with the phase change material element 250. In various embodiments, the sink elements 220 may be hollow and at least partially filled with phase change material element 250.

Other types of sink elements 220 may be provided in alternative embodiments, such as fins. In other various embodiments, the sink elements 220 may be a thermally conductive matrix, such as conductive strands, conductive foam, conductive mesh, and the like filling portions of the absorber chamber 212 to dissipate heat into the phase change material element 250. The sink elements 220 may be loosely dispersed within the phase change material elements 250 rather than being integral with the absorber housing 210. In other embodiments, the sink elements 220 may be heat pipes or other thermal transfer elements extending into the absorber chamber 212. In various embodiments, the material of the thermal absorbers 200 may have sink elements mixed in, such as material having conductivity enhancing materials (such as ceramic powder, etc.) in lieu of or to supplement the heat-sink like "fingers" that reach into absorber chamber 212.

In an exemplary embodiment, the thermal absorber 200 includes a thermal spreader 230 extending between the fixed contact 120 and the absorber housing 210. The thermal spreader 230 forms a thermal path between the fixed contact 120 and the phase change material element 250. The thermal spreader 230 transfers heat from the fixed contact 120 to the absorber housing 210 and/or the phase change material element 250. In various embodiments, the thermal spreader 230 is a metal plate. Other types of thermal spreaders may be used in alternative embodiments, such as pipes. The thermal spreader 230 includes a first interface 232 and a second interface 234. The first and second interfaces 232, 234 may be provided at opposite ends of the thermal spreader 230. The first interface 232 is configured to interface with the fixed contact 120 and/or the terminal 136 and/or the wire 134. The second interface 234 is configured to interface with the absorber housing 210, such as the upper wall 216. In alternative embodiments, the thermal spreader 230 may be integral with the upper wall 216 (or other wall of the absorber housing 210) rather than having a separate thermal interface.

In an exemplary embodiment, the phase change material element 250 is used to passively capture heat generated by the contactor 100. The phase change material element 250 may be one or more substances with a high heat of fusion and capable of storing and releasing large amounts of energy. The phase change material element 250 may be capable of melting and solidifying at a specific temperature or temperature range (melting temperature). The temperature of the phase change material element 250 rises as it absorbs heat. Below the melting temperature, the phase change material element 250 is in a solid form. As the phase change material element 250 absorbs heat, the phase change material element 250 may eventually reach the melting temperature. Upon reaching the melting temperature, the phase change material element 250 continues to absorb heat without a significant rise in temperature. The heat absorption continues until all of the phase change material element 250 has transformed to a liquid phase. The melting temperature depends on the type of material used. The material used for the phase change material element 250 is selected based on the estimated temperature range within the contactor during operation. The amount of phase change material element 250 may be selected to take the transient excess heat from the operation of the contactor 100.

In an exemplary embodiment, the phase change material element 250 is a sugar alcohol material, such as erythritol. The phase change material element 250 has a high specific heat capacity, such as a specific heat capacity greater than copper and aluminum. The phase change material element 250 may have a specific heat capacity of greater than 1.00 J/g-K. The phase change material element 250 may have a specific heat capacity of greater than 2.50 J/g-K. The phase change material element 250 may have a specific heat capacity of greater than 3.00 J/g-K. The phase change material element 250 has a high latent heat of fusion. The phase change material element 250 may have a latent heat of fusion greater than 100 J/g. The phase change material element 250 may have a latent heat of fusion greater than 250 J/g. The phase change material element 250 may have a latent heat of fusion greater than 333 J/g. The phase change material element 250 may have a latent heat of fusion greater than water.

In the illustrated embodiment, a pair of the thermal absorbers 200 is provided. Each thermal absorber 200 is thermally coupled to the corresponding fixed contacts 120. The thermal absorbers 200 absorb heat from the fixed contacts 120 to reduce the operating temperature of the contactor 100. The thermal absorbers 200 absorb heat from the terminals 136 and the wires 134 to reduce the operating temperature of the contactor 100. The thermal spreaders 230 thermally connect the fixed contacts 120 and the phase change material elements 250 of the thermal absorbers 200. For example, the thermal spreaders 230 are thermally coupled to the upper walls 218 of the absorber housings 210. The sink elements 220 extend from the upper walls 218 into the absorber chambers 212 to transfer the heat generally uniformly through the phase change material elements 250 to improve thermal transfer from the contactor 100. The thermal absorbers 200 may be relatively light-weight compared to metal heat sinks or larger contactors 100. For example, the phase change material elements 250 has a light weight compared to metal. The phase change material elements 250 have high latent thermal mass density and ability to absorb heat on phase change to provide improved thermal performance compared to metal heat sink solutions.

In alternative embodiments, greater or fewer thermal absorbers 200 may be provided, such as a single thermal absorber 200 which may be thermally coupled to both of the fixed contacts 120.

In various embodiments, an electrical isolator element may be provided between the thermal absorbers 200 and the fixed contacts 120. The electrical isolator element is thermally conductive. The isolator may be a dielectric pad, such as a thermally conductive gasket. The isolator may be a coating or film applied to one or more surfaces of the thermal spreader 230 or the absorber housing 210.

In an exemplary embodiment, the thermal absorbers 200 are located exterior of the housing 110 of the contactor 100.

For example, the thermal absorbers 200 are located outside of the cavity 112. The thermal absorbers 200 may be located on opposite sides of the contactor 100. The thermal absorbers 200 may be spaced apart from the wall 111. The thermal absorbers 200 may be spaced apart from the base 114. For example, the thermal absorbers 200 may be located at the top of the contactor 100.

In the illustrated embodiment, the thermal absorbers 200 are generally box-shaped. For example, the thermal absorbers 200 may have four sides surrounding the absorber chamber 212. The thermal absorbers 200 may have other shapes in alternative embodiments. For example, the thermal absorbers 200 may have complimentary shapes to the exterior of the housing 110 (for example, crescent shaped to follow the outer profile of the housing 110). For example, each thermal absorber 200 may extend approximately 180° around the exterior of the housing 110. In other various embodiments, the thermal absorbers 200 may be shaped similar to the base 114, such as to mimic the footprint of the housing 110 and not occupy additional space beyond the footprint of the housing 110. In other various embodiments, the thermal absorbers 200 may be located above the top of the contactor 100 so as to not occupy additional space beyond the footprint of the housing 110. In various embodiments, the thermal absorbers 200 may add less than 50% volume to the contactor. In other various embodiments, the thermal absorbers 200 may add less than 25% volume to the contactor. In still further embodiments, the thermal absorbers 200 may add 10% or less volume to the contactor. The thermal absorbers 200, with the phase change material, allows, in applications involving transient thermal current (thermal) excursions, for lower contactor volume and weight when compared to relying solely on metal heatsinks or thermal masses of more traditional materials with a lower specific heat capacity and no phase transition. However, in alternative embodiments, the thermal absorbers 200 may be used in addition to other types of heat sinks, such as finned heat sinks or metal heat transfer elements. Heat sinking may offer good stead-state dissipation. However, the addition of the thermal absorbers 200, with the benefits of the phase change material, such as high specific heat capacity and heat absorption during melting, is effective for the transient high-current (transient thermal) excursions described. A mix of both types of heat dissipating elements is possible. The proportion of size and weight allocated for heat sink dissipation versus thermal absorbers 200 and phase change material transient thermal absorption may be tailored, depending on the expected load current profile and contactor design, for a size and weight optimized for the given application.

In other embodiments, the thermal absorbers 200 may be located within the cavity 112 of the housing 110, such as within the interior of the wall 111. In such embodiments, the housing 110 may include an inner wall and an outer wall with a space therebetween that receives the thermal absorbers 200.

In other embodiments, the thermal absorbers 200 may surround the wires 134, such as being sleeves circumferentially surrounding the wires and extending away from the contactor 100. The sleeves may be filled with the phase change material elements 250.

In various embodiments, the thermal absorber 200 may include a temperature sensor, such as embedded in the housing with the phase change material or located on the outside of the housing or connected to the contact. The temperature sensor can measure the change in temperature, the rate of temperature change, the actual temperature, and the like. The temperature sensor may determine the state of the phase change material.

Figure 5:
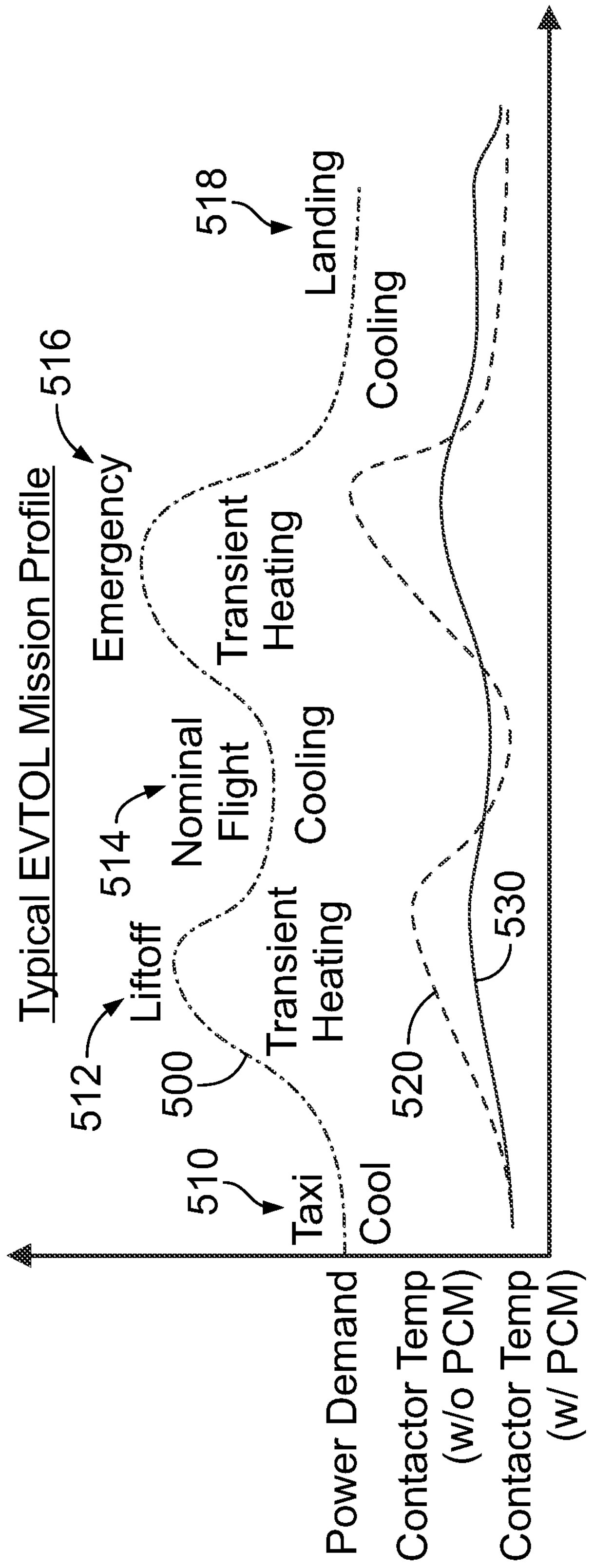
FIG. 5 is a graph showing an exemplary operation profile for a contactor that is typical of an electric vertical take-off and landing (EVTOL) that uses electric power to hover, take off, maneuver in flight, and then land vertically in accordance with an exemplary embodiment.

FIG. 5 is a graph showing an exemplary operation profile for a contactor that is typical of an electric vertical take-off and landing (EVTOL) that uses electric power to hover, take off, maneuver in flight, and then land vertically. The operation profile is a pulsed profile having periods of high demand and periods of low demand and the contactor is capable of absorbing heat generated during the high demand times and dissipate the absorbed heat during the periods of low demand. The graph shows power demand 500 during taxi 510, liftoff 512, nominal flight 514, emergency flight 516, and landing 518. The graph shows a plot 520 of contactor temperature without use of the thermal absorbers and a plot 530 of contactor temperature with use of the thermal absorbers 200 associated with the power demand profile 500. The contactor without thermal absorbers experiences higher peak temperatures, which may be above an allowable operating temperature, which may lead to damage or failure of the contactor. The contactor with thermal absorbers experiences lower peak temperatures because the phase change material elements 250 absorb heat from the contactor to spread heating and cooling over time. The thermal absorbers provide heat absorption over short durations, such as approximately 10 minute durations, to lower peak operating temperatures.

Figure 6:
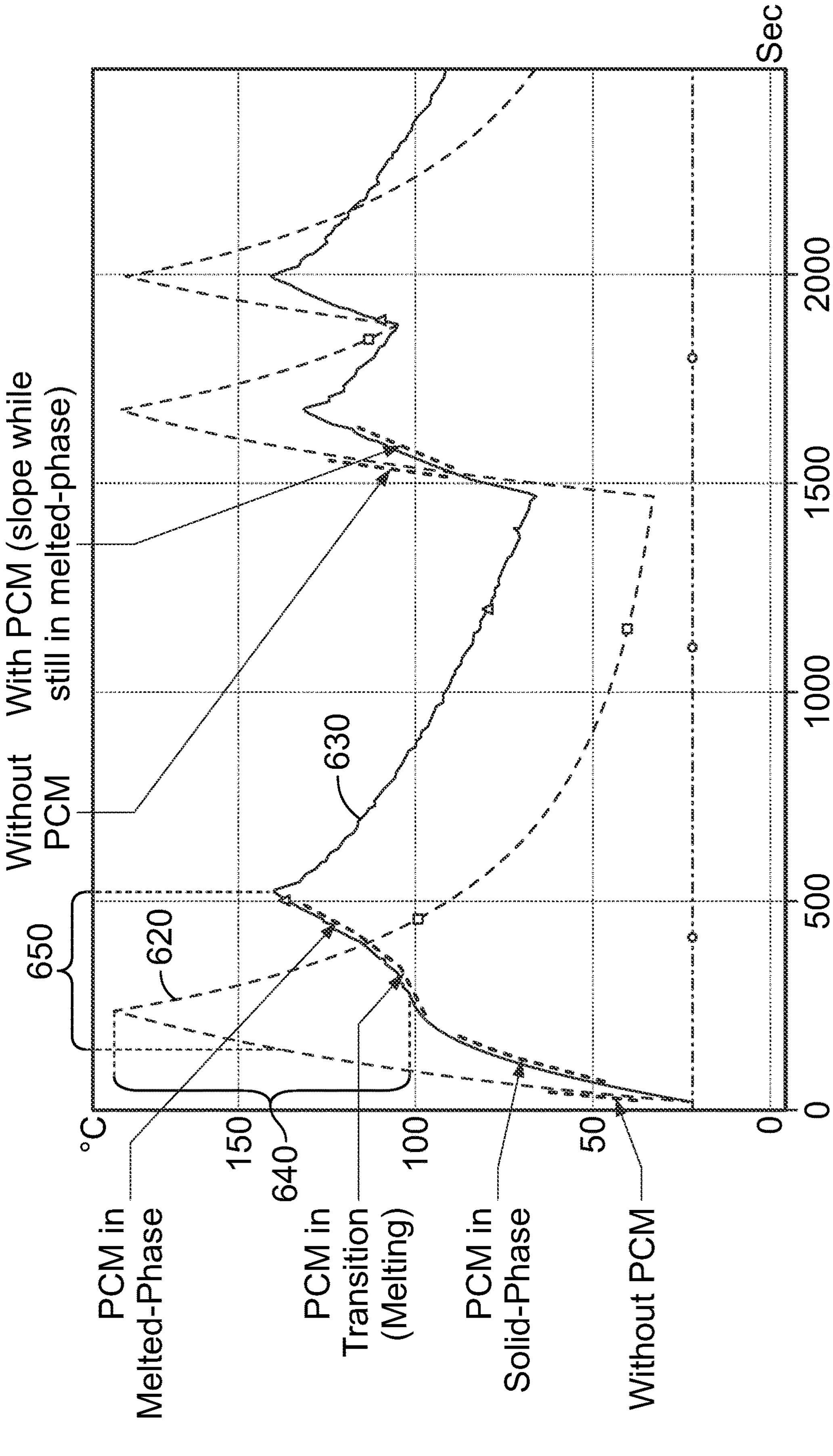
FIG. 6 is a graph showing temperature profiles for contactors in accordance with an exemplary.

FIG. 6 is a graph showing temperature profiles for contactors. The graph shows a plot 620 of contactor temperature without use of the thermal absorbers and a plot 630 of contactor temperature with use of the thermal absorbers. The slopes of the lines represent temperature change rate and illustrates the relative thermal capacity of the two contactors (with and without thermal absorbers). The contactor with the thermal absorbers outperforms the contact without the thermal absorbers by better handling temperature increases due to load. The contactor without thermal absorbers experiences higher peak temperatures, which may be above an allowable operating temperature, which may lead to damage or failure of the contactor. The contactor with thermal absorbers experiences lower peak temperatures because the phase change material elements 250 absorb heat from the contactor to spread heating and cooling over time.

The contactor heats up when powered on and, subject to the loads power demand profile, cools when powered off. The plot 620 illustrates that the contactor without thermal absorbers heats quickly when powered (for example, powered on at 0 seconds, 1500 seconds, and 1900 seconds). The plot 620 illustrates that the contactor is shut off at approximately 180° C., which occurs at approximately 300 seconds, again at approximately 1700 seconds (after a cooldown period), and again at approximately 2000 (after a cooldown period).

In comparison, the plot 630 illustrates that the contactor with thermal absorbers heats at a different rate than the contactor without the thermal absorbers (for example, powered on at 0 seconds, 1500 seconds, and 1900 seconds). The plot 620 illustrates that the contactor is shut off at approximately 140° C., which is a lower shut-off temperature than the contactor without the thermal absorbers and thus the contactor with the thermal absorbers is less susceptible to damage because the contactor operates at a lower average temperature. The shut off occurs at approximately 600 seconds, again at approximately 1700 seconds (after a cooldown period), and again at approximately 2000 (after a cooldown period).

The plots 620, 630 between approximately 1500 seconds and 2000 seconds emulate a thermal excursion from an emergency event load. The contactor with the thermal absorbers provides significant improvement in the thermal excursion magnitude (less peak temperature) even though the material of the thermal absorbers is still in the melted (liquid) state at the time of the event. The peak temperature of the contactor with the thermal absorbers remains far lower than the contactor without the thermal absorbers even though the contactor without the thermal absorbers was able to cool down to less than the contactor with the thermal absorbers at the time of the event. At approximately 1800 seconds a further excursion was stared when the two contactors were at the same temperature and when the contactor with the thermal absorbers was still in the melt phase to illustrate the advantage of the contactor with the thermal absorbers having significantly lower temperature change rate (slope). The contactor with the thermal absorbers has better relative thermal capacity than the contactor without the thermal absorbers. In various embodiments, the best operation of the contactor with the thermal absorbers would be operated at just below the transition phase temperature to optimize its largest thermal capacity, which is in the transition phase (while melting).

When comparing the plots 620, 630, it is evident that the operating temperature of the contactor with the thermal absorbers operates at a lower temperature. For example, at 300 seconds, when the contactor without the thermal absorbers is shut off, the contactor with the thermal absorbers is approximately 85° C. lower (temperature difference 640). Additionally, at a target shut-off temperature of 140° C., the contactor with the thermal absorbers is able to operate approximately 380 seconds longer (150 seconds vs 530 seconds) (time difference 650). The shut off temperature of 180° C. shown in FIG. 6 is a potentially damaging temperature for the contactor to operate and it may be preferred to shut-off at 140° C. When comparing the time to reach the max recommended terminal temperature of 140° C. (for typical high-temperature plastic and epoxy sealed vacuum contactor construction), the contactor with thermal absorbers is able to operate approximately 380 seconds longer (150 seconds vs 530 seconds). The non-PCM contactor was turned off at 180° C., as it would far exceeded this damaging temperature threshold if allowed to remain powered on to the same time at which the contactor with thermal absorbers reached 140° C. The contactor with thermal absorbers is able to operate for a longer period of time and at a lower operating temperature. Even when starting at a higher starting temperature, the contactor with the thermal absorbers may have better performance.

Figure 7:
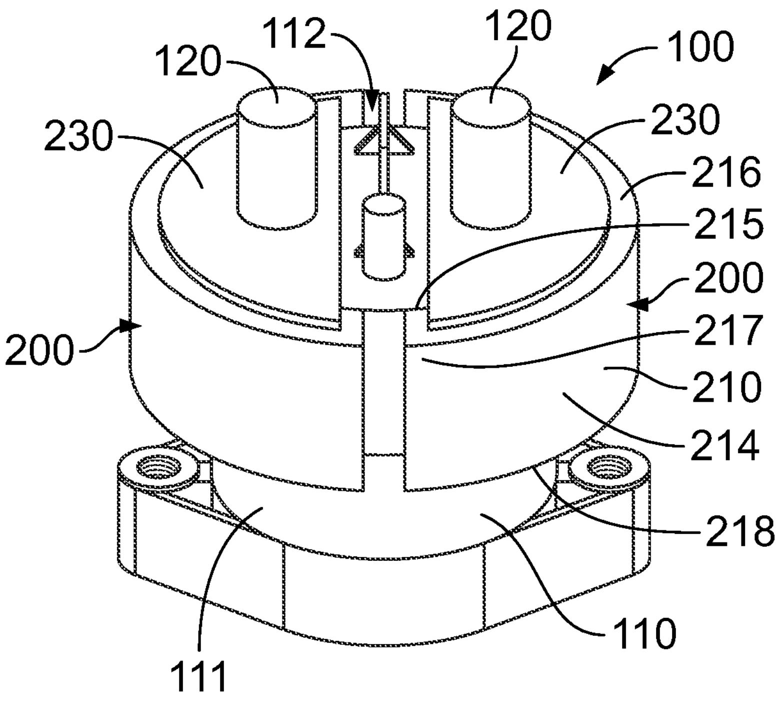
FIG. 7 is a perspective view of the contactor in accordance with an exemplary embodiment including the thermal absorbers.
Figure 8:
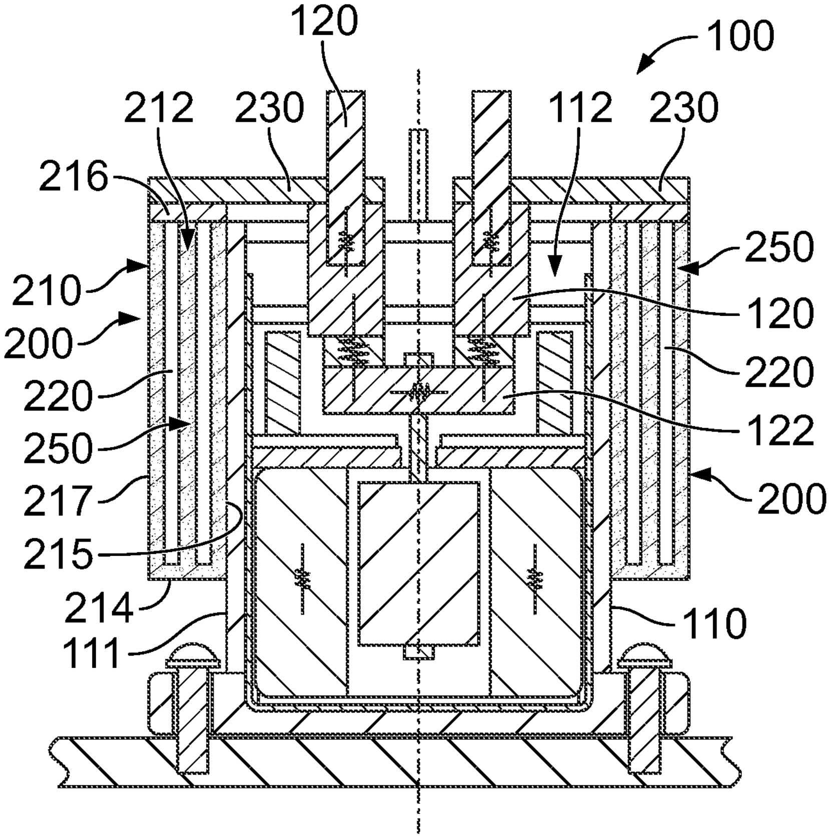
FIG. 8 is a cross-sectional view of the contactor in accordance with an exemplary embodiment.

FIG. 7 is a perspective view of the contactor 100 in accordance with an exemplary embodiment including the thermal absorbers 200. FIG. 8 is a cross-sectional view of the contactor 100 in accordance with an exemplary embodiment. The contactor 100 includes the housing 110 having the wall 111 surrounding the cavity 112. The mounting brackets may be provided at the right and left sides and/or the front and rear of the housing 110, such as being aligned with the pockets or openings between the thermal absorbers for easier access. The contactor 100 includes the fixed contacts 120 and the movable contact 122 in the cavity 112.

In the illustrated embodiment, the thermal absorbers 200 are coupled to the housing 110. The thermal absorbers 200 may be form-fitting to the housing 110 to enhance compactness of the overall package. The thermal absorbers 200 are coupled to the exterior surface of the wall 111. For example, the absorber housing 210 is coupled to the wall 111. The side wall 214 of the absorber housing 210 directly engages the exterior of the wall 111. The absorber housings 210 of the thermal absorbers 200 enclose the wall 111, such as being crescent shaped around the exterior of the housing 110. For example, the walls 214 of the absorber housing 210 include an inner wall 215 facing the wall 111 of the housing 110 and an outer wall 217 opposite the inner wall 215. The inner and outer walls 215, 217 are curved and may have a generally uniform spacing therebetween. The phase change material element 250 is located in the space between the inner and outer walls 215, 217. The thermal spreader 230 may be shaped similar to the upper wall 216 to thermally couple the fixed contact 120 to the thermal absorber 200. The sink elements 220 extend into the absorber chamber 212 to directly interface with the phase change material element 250.

Figure 9:
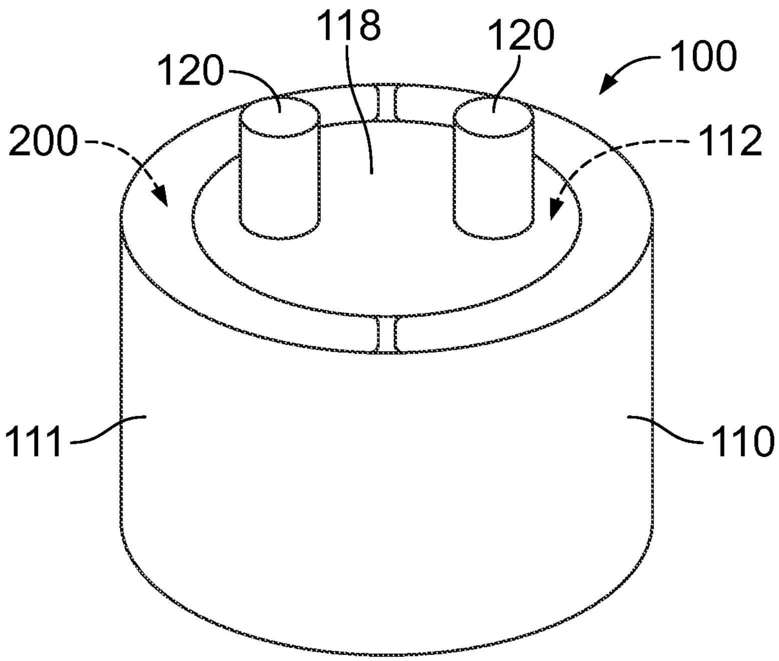
FIG. 9 is a perspective view of the contactor in accordance with an exemplary embodiment including the thermal absorbers.
Figure 10:
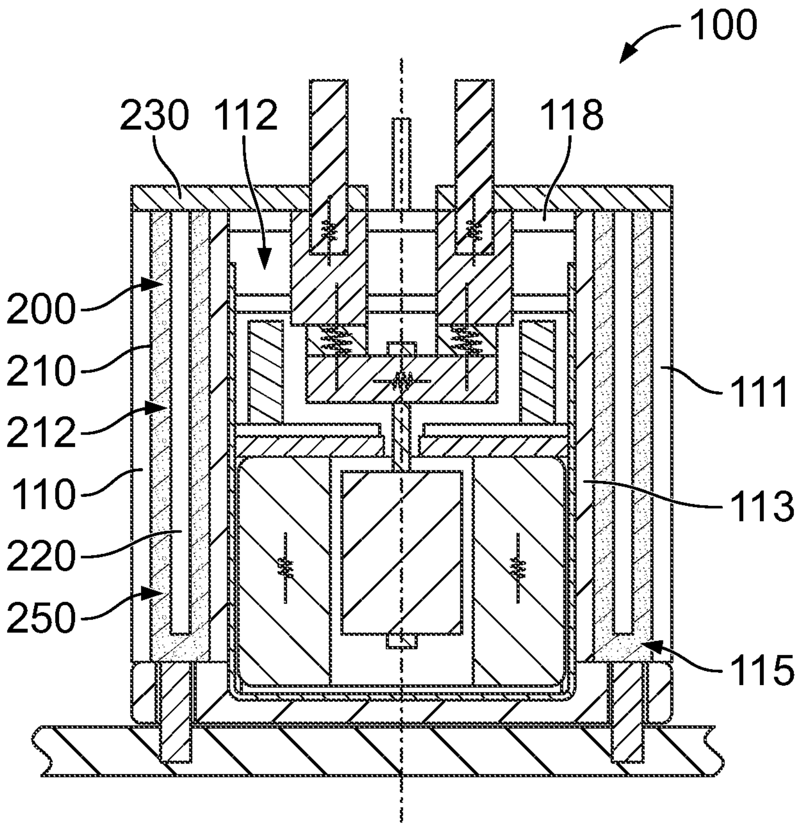
FIG. 10 is a cross-sectional view of the contactor in accordance with an exemplary embodiment.

FIG. 9 is a perspective view of the contactor 100 in accordance with an exemplary embodiment including the thermal absorbers 200. FIG. 10 is a cross-sectional view of the contactor 100 in accordance with an exemplary embodiment. The contactor 100 includes the housing 110 having the wall 111 surrounding the cavity 112. The contactor 100 includes the fixed contacts 120 and the movable contact 122 in the cavity 112.

In an exemplary embodiment, the housing 110 includes internal walls 113 forming pockets 115. The pockets 115 are located within the cavity 112. The pockets 115 are defined between the internal walls 113 and the outer wall 111. The pockets 115 receive the thermal absorbers 200. The thermal absorbers 200 may be coupled to the housing 110, such as being coupled to the internal walls 113 and/or the outer wall 111. The thermal absorbers 200 are coupled to the interior surface of the wall 111. The absorber housings 210 may be crescent shaped to extend around the outer perimeter of the cavity 112. The phase change material element 250 is located in the pocket 115. The thermal spreader 230 may be coupled to the inner surface of the cover 118 to thermally couple the fixed contact 120 to the thermal absorber 200. The sink elements 220 extend into the absorber chamber 212 to directly interface with the phase change material element 250.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first." "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A contactor comprising:

a housing having a wall defining a cavity and a cover closing the cavity;

a first fixed contact and a second fixed contact received in the cavity;

a movable contact movable within the cavity between a mated position and an unmated position, the movable contact engaging the first and second fixed contacts to electrically connect the first fixed contact and the second fixed contact in the mated position;

a coil assembly in the cavity operated to move the movable contact between the unmated position and the mating position; and a thermal absorber thermally coupled to the first fixed contact to reduce an operating temperature of the first fixed contact, the thermal absorber including a phase change material element configured to absorb heat from the first fixed contact, wherein the thermal absorber is electrically isolated from the first fixed contact by an electrical isolation element.

2. The contactor of claim 1, wherein the thermal absorber is thermally coupled to a terminal electrically coupled to the first fixed contact to dissipate heat from the terminal.

3. The contactor of claim 1, wherein the thermal absorber is thermally coupled to a cable terminated to the first fixed contact to dissipate heat from the cable.

4. The contactor of claim 1, wherein the thermal absorber is received in the cavity.

5. The contactor of claim 1, wherein the thermal absorber extends along an exterior of the wall of the housing.

6. The contactor of claim 1, wherein the thermal absorber adds less than 10% volume to the contactor.

7. The contactor of claim 1, wherein the thermal absorber fits within a footprint of the housing.

8. The contactor of claim 1, wherein the thermal absorber is thermally coupled to the second fixed contact to reduce an operating temperature of the second fixed contact.

9. The contactor of claim 1, further comprising a second thermal absorber thermally coupled to the second fixed contact to reduce an operating temperature of the second fixed contact, the second thermal absorber including a phase change material element configured to absorb heat from the second fixed contact.

10. The contactor of claim 1, wherein the thermal absorber includes an absorber housing defining an absorber chamber, the phase change material element received in the absorber chamber.

11. The contactor of claim 10, wherein the absorber housing is coupled to the housing.

12. The contactor of claim 10, wherein the thermal absorber includes a thermal spreader extending between the first fixed contact and the absorber housing, the thermal spreader transferring heat from the first fixed contact to the absorber housing.

13. The contactor of claim 10, wherein the thermal absorber includes at least one sink element extending into the absorber chamber, the phase change material element surrounding the at least one sink element to transfer heat between the at least one sink element and the phase change material element.

14. The contactor of claim 13, wherein the at least one sink element includes metal posts arranged in an array within the absorber chamber.

15. A contactor comprising:

a housing having a wall defining a cavity and a cover closing the cavity, the housing including a chamber wall defining a chamber;

a first fixed contact and a second fixed contact received in the cavity;

a movable contact movable within the cavity between a mated position and an unmated position, the movable contact engaging the first and second fixed contacts to electrically connect the first fixed contact and the second fixed contact in the mated position;

a coil assembly in the cavity operated to move the movable contact between the unmated position and the mating position; and a thermal absorber received in the chamber, the thermal absorber thermally coupled to the first fixed contact to reduce an operating temperature of the first fixed contact, the thermal absorber including a phase change material element configured to absorb heat from the first fixed contact, wherein the thermal absorber is electrically isolated from the first fixed contact by an electrical isolation element.

16. The contactor of claim 15, wherein the chamber wall and the chamber are located within the cavity.

17. The contactor of claim 15, wherein the chamber wall and the chamber are located along an exterior of the wall of the housing.

18. A contactor comprising:

a housing having an outer wall defining a cavity and a cover closing the cavity;

a first fixed contact and a second fixed contact received in the cavity;

a movable contact movable within the cavity between a mated position and an unmated position, the movable contact engaging the first and second fixed contacts to electrically connect the first fixed contact and the second fixed contact in the mated position;

a coil assembly in the cavity operated to move the movable contact between the unmated position and the mating position; and a thermal absorber thermally coupled to the first fixed contact to reduce an operating temperature of the first fixed contact, the thermal absorber including an absorber housing defining an absorber chamber, the absorber housing located exterior of the housing, the thermal absorber including a phase change material element received in the absorber chamber, the phase change material element configured to absorb heat from the first fixed contact, wherein the thermal absorber is electrically isolated from the first fixed contact by an electrical isolation element.

19. The contactor of claim 18, wherein the thermal absorber includes at least one sink element extending into the absorber chamber, the phase change material element surrounding the at least one sink element to transfer heat between the at least one sink element and the phase change material element.

* * * * *